(12) United States Patent
Hirata et al.

(10) Patent No.: US 10,838,435 B2
(45) Date of Patent: Nov. 17, 2020

(54) PRESSURE-TYPE FLOW RATE CONTROL DEVICE

(71) Applicant: FUJIKIN INCORPORATED, Osaka (JP)

(72) Inventors: Kaoru Hirata, Osaka (JP); Katsuyuki Sugita, Osaka (JP); Nobukazu Ikeda, Osaka (JP); Kouji Nishino, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 16/317,692

(22) PCT Filed: Jul. 25, 2017

(86) PCT No.: PCT/JP2017/026899
§ 371 (c)(1),
(2) Date: Jan. 14, 2019

(87) PCT Pub. No.: WO2018/021327
PCT Pub. Date: Feb. 1, 2018

(65) Prior Publication Data
US 2019/0250648 A1    Aug. 15, 2019

(30) Foreign Application Priority Data

Jul. 28, 2016  (JP) .................................. 2016-149002

(51) Int. Cl.
*F16K 31/02* (2006.01)
*G05D 7/06* (2006.01)
(Continued)

(52) U.S. Cl.
CPC ............. *G05D 7/0635* (2013.01); *G05D 7/06* (2013.01); *G01F 1/363* (2013.01); *G05D 16/08* (2013.01); *G05D 16/20* (2013.01)

(58) Field of Classification Search
CPC ........ G05D 7/0635; G05D 7/06; G05D 16/08; G05D 16/20; G01F 1/363
(Continued)

(56) References Cited

U.S. PATENT DOCUMENTS 6,832,628 B2 * 12/2004 Thordarson .......... G05D 7/0106
                                                    137/488
8,794,261 B2 *  8/2014 Watanabe ................. F17D 3/00
                                                    137/486
(Continued)

FOREIGN PATENT DOCUMENTS

JP      S56-011517 A      2/1981
JP      2003-316442 A    11/2003
(Continued)

OTHER PUBLICATIONS

International Search Report issued in PCT/JP2017/026899; dated Oct. 17, 2017.

*Primary Examiner* — Minh Q Le
(74) *Attorney, Agent, or Firm* — Studebaker & Brackett PC

(57) ABSTRACT

A pressure-type flow rate control device includes a control valve; a pressure sensor provided downstream of the control valve; an orifice-built-in valve provided downstream of the pressure sensor; and a control unit connected to the control valve and pressure sensor. The built-in orifice valve has a valve mechanism comprising a valve seat body and a valve element for opening/closing a flow path; a drive mechanism for driving the valve mechanism, and an orifice member provided in the vicinity of the valve mechanism. The pressure-type flow rate control device further includes an opening/closing-detection mechanism for detecting the open/closed state of the valve mechanism, the control unit being (Continued)

configured to receive a detection signal from the opening/closing-detection mechanism.

4 Claims, 3 Drawing Sheets

(51) Int. Cl.
    *G05D 16/08*         (2006.01)
    *G01F 1/36*          (2006.01)
    *G05D 16/20*         (2006.01)

(58) Field of Classification Search
    USPC .............. 137/487.5, 487, 489; 251/285; 73/861.42, 861.52, 861.53, 861.62
    See application file for complete search history.

(56) References Cited

U.S. PATENT DOCUMENTS

| | | | | |
|---|---|---|---|---|
| 2003/0023903 | A1* | 1/2003 | Kumeda | G05B 23/027 714/25 |
| 2003/0213520 | A1* | 11/2003 | Prinz | G05D 16/2013 137/487.5 |
| 2004/0244837 | A1* | 12/2004 | Nawata | G05D 7/0635 137/487.5 |
| 2010/0139775 | A1* | 6/2010 | Ohmi | G01F 1/363 137/12 |
| 2011/0108126 | A1* | 5/2011 | Monkowski | G05D 7/0635 137/12 |
| 2011/0120566 | A1 | 5/2011 | Ohmi et al. | |
| 2013/0001453 | A1 | 1/2013 | Hirose et al. | |
| 2014/0069527 | A1* | 3/2014 | Mudd | G05D 7/0635 137/487 |
| 2014/0113819 | A1* | 4/2014 | Niksa | C01B 13/0214 504/151 |
| 2014/0261870 | A1* | 9/2014 | Olson | B01F 5/0268 141/9 |
| 2016/0274595 | A1* | 9/2016 | Ohmi | G01F 1/6847 |
| 2016/0327963 | A1* | 11/2016 | Hirata | G05D 7/0641 |
| 2016/0349763 | A1* | 12/2016 | Hirose | G05D 7/0635 |
| 2017/0212531 | A1 | 7/2017 | Nagase et al. | |
| 2019/0094847 | A1* | 3/2019 | Nagase | G05D 7/06 |
| 2019/0129452 | A1* | 5/2019 | Hirata | G05D 7/0635 |
| 2020/0033895 | A1* | 1/2020 | Sugita | G05D 7/0635 |

FOREIGN PATENT DOCUMENTS

| | | |
|---|---|---|
| JP | 4137267 B2 | 8/2008 |
| JP | 2011-154433 A | 8/2011 |
| JP | 2013-229052 A | 11/2013 |
| JP | 2016-024708 A | 2/2016 |
| KR | 101422973 B1 | 7/2014 |

\* cited by examiner

PRESSURE-TYPE FLOW RATE CONTROL DEVICE

TECHNICAL FIELD

The present invention relates to a pressure-type flow rate control device, and especially relates to a pressure-type flow rate control device including an orifice-built-in valve.

BACKGROUND ART

In semiconductor manufacturing equipment and chemical plants, various types of flowmeters and flow rate control devices for controlling fluids such as raw material gases and etching gases are used. Among these, pressure-type flow rate control devices are widely used because they are capable of controlling the flow rates of various fluids with high accuracy by a relatively simple mechanism combining, for example, a piezo element-driven control valve and a restriction part (such as an orifice plate or a critical flow nozzle).

Some pressure-type flow rate control devices perform flow rate control utilizing the principle that a flow rate is determined by an upstream gas pressure $P1$ regardless of a downstream gas pressure $P2$ when the critical expansion condition $P1/P2 \geq 2$ is satisfied ($P1$: the gas pressure upstream of the restriction part, $P2$: the gas pressure downstream of the restriction part). Pressure-type flow control devices of this type are capable of controlling the flow rate of gas flowing downstream of the restriction part with high accuracy by controlling just the upstream pressure $P1$ through the use of a pressure sensor and a control valve.

Patent document 1 discloses a pressure-type flow rate control device including an on/off valve (orifice-built-in valve) having an orifice as a restriction part. In the pressure-type flow rate control device including an orifice-built-in valve, the pressure upstream of the orifice is controlled by the control valve and the outflow of the gas is controlled by the orifice-built-in valve, so that it is possible to supply the gas at a well-controlled flow rate with good rising and falling characteristics.

In addition, in recent years, it has been desired that gases be supplied to processing chambers in ALD (atomic layer deposition) and ALE (atomic layer etching) processes for only a short period of time (in the form of pulses), and that a pressure-type flow rate control device having an orifice-built-in valve be utilized.

PRIOR ART DOCUMENT

Patent Document

Patent document 1: Japanese Patent No. 4137267
Patent document 2: Japanese Unexamined Patent Publication No. 2003-316442
Patent document 3: Japanese Unexamined Patent Publication No. 2011-154433

SUMMARY OF INVENTION

Problems to be Solved by Invention

A configuration in which an air operated valve (AOV: Air Operated Valve) interposed in the gas flow path of a flow rate control device can be used as a valve mechanism of an opening/closing valve, and an electromagnetic valve for controlling supply of compressed air to the air operated valve can be provided (for example, patent document 2). This configuration can be employed for an orifice-built-in valve, and in such a case, the opening/closing operation of the orifice-built-in valve is controlled by an opening/closing signal to the electromagnetic valve, and the opening/closing state of the valve can be controlled by this opening/closing signal.

However, in some cases, the opening/closing signal output to the electromagnetic valve may be different from the actual opening/closing operation of the orifice-built-in valve. For example, when a malfunction occurs in the compressed air supply system to the AOV, the AOV may not operate even if the electromagnetic valve is in the open state. In addition, since an AOV is operated by supplying compressed air, the opening and closing of the AOV may be delayed after the opening and closing of the electromagnetic valve, depending on the design of the air supply system (for example, diameter and length of air tube). Therefore, the opening/closing signal input to the electromagnetic valve and the actual opening/closing operation of the AOV are frequently not synchronized.

In recent-year applications (for example, the ALD mentioned above) of using an orifice-built-in valve, several kinds of gases are supplied and switched, but the timing of the gas switching is very fast. Therefore, it is important to be able to control the gas flow rate with good rising and falling characteristics, and to be able to accurately check the actual gas flow rate in real time. Therefore, when the actual opening/closing operation of the AOV cannot be detected as described above, it has been difficult to apply orifice-built-in valves to recent-year applications.

In a pressure-type flow rate control device utilizing an orifice-built-in valve, in some cases the flow rate may be calculated from the gas pressure upstream of the orifice. After closing the orifice-built-in valve, the gas pressure upstream of the orifice usually rises. Therefore in some cases, although the valve may be actually closed with no gas flowing, a flow rate corresponding to the increased gas pressure may be outputted as a calculated flow rate.

With respect to this problem, patent document 2 describes that when an on/off valve is closed, the flow rate value is displayed as 0, regardless of the output of the pressure sensor. However, when the actual valve opening/closing state is undetermined, incorrect flow rate is displayed, or the timing is shifted and an incorrect flow rate is eventually displayed.

The present invention has been conceived in light of the above problems, and mainly aims to provide a pressure-type flow rate control device having an orifice-built-in valve, that is capable of suitably detecting and controlling the flow rate of gas.

Means for Solving Problems

A pressure-type flow rate control device according to one embodiment of the present invention includes a control valve; a pressure sensor provided downstream of the control valve; an orifice-built-in valve provided downstream of the pressure sensor; and a control unit connected to the control valve and the pressure sensor, the pressure-type flow rate control device being configured to control the control valve in accordance with a output of the pressure sensor; the orifice-built-in valve being provided with a valve mechanism having a valve seat body and a valve element for opening/closing the flow path; a drive mechanism driving the valve mechanism; and an orifice member provided in the vicinity of the valve mechanism, the orifice member including an opening/closing-detection mechanism for detecting the opening/closing state of the valve mechanism, and the orifice member being configured to receive a detection signal from the opening/closing-detection mechanism.

In one embodiment, the valve mechanism includes a fluid operation valve, and the drive mechanism includes an electromagnetic valve controlling the supply of a fluid to the fluid-operation valve.

In one embodiment, the opening/closing-detection mechanism includes a limit switch, such that the limit switch can generate an on/off signal in response to the movement of the valve element.

In one embodiment, the control unit detects the flow rate of gas passing through the orifice-built-in valve in accordance with a signal output from the pressure sensor, and detects the detection signal from the opening/closing-detection mechanism.

In one embodiment, when the detection signal from the opening/closing mechanism indicates a closed state of the orifice-built-in valve, the control unit determines a flow rate of zero, regardless of the output value of the pressure sensor.

Effect of Invention

A pressure-type flow rate control device provided with an orifice-built-in valve according to one embodiment of the present invention is capable of suitably controlling and detecting the flow rate of a gas.

MODES FOR CARRYING OUT INVENTION

Embodiments of the present invention will be described below with reference to the drawings, but the present invention is not limited to the following embodiments.

Figure 1:
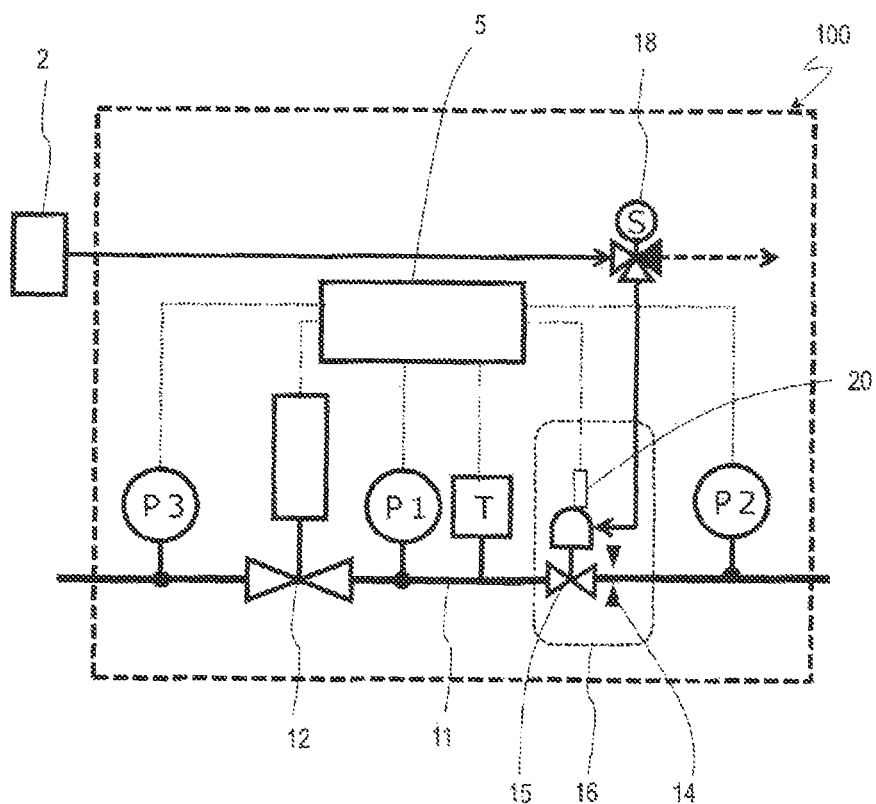
FIG. 1 is a schematic drawing showing the constitution of a pressure-type flow rate control device according to one embodiment of the present invention.

FIG. 1 is a drawing which shows the entire constitution of a pressure-type flow rate control device 100 according to one embodiment of the present invention. This pressure-type flow rate control device 100 includes a control valve 12 interposed in a gas flow path 11, an orifice-built-in valve 16 provided downstream of the control valve 12, a first pressure sensor (upstream pressure sensor) P1 and a temperature sensor T provided between the control valve 12 and the orifice-built-in valve 16, and a second pressure sensor (downstream pressure sensor) P2 provided downstream of the orifice-built-in valve 16. The first pressure sensor P1 is capable of measuring the pressure in the flow path between the control valve 12 and the orifice-built-in valve 16, and the second pressure sensor P2 is capable of measuring the pressure downstream of the orifice-built-in valve 16 (for example, the flow path between the orifice-built-in valve 16 and a downstream shut-off valve (not shown)). Further, in the pressure-type flow rate control device 100 of the present embodiment, a third pressure sensor P3 is provided upstream of the control valve 12, so it is possible to measure the pressure of gas supplied from a gas supply device (for example, raw material vaporizer) (not shown) and to control the amount of raw material supply.

The orifice-built-in valve 16 has an orifice member 14 and a fluid-operated valve 15 as an on/off valve provided upstream of the orifice member 14; an electromagnetic valve 18 is connected to a fluid-operated valve 15 as a drive mechanism. In the orifice-built-in valve 16, the opening/closing operation is performed by controlling the supply of fluid from the air source 2 (air tank, compressor, etc.) to the orifice-built-in valve 16 using the electromagnetic valve 18. It should be noted that the orifice member 14 may be provided upstream of the fluid-operated valve 15 and an important point is to reduce the capacity of the flow path formed between the orifice member 14 and the fluid-operated valve 15. By using the orifice-built-in valve 16 provided with the valve mechanism in the vicinity of the orifice as described above, it is possible to appropriately perform gas supply to the process chamber over a short period of time with a high-speed gas shutoff operation.

In this embodiment, the orifice member 14 is constructed using a stainless steel orifice plate held by a holder (see FIG. 2), and, for example, an orifice with a diameter of 10 to 500 μm is formed within an orifice plate with a thickness of 20 to 500 μm. However, the present invention is not limited to such a configuration, and the orifice member 14 may be, for example, an orifice integrally formed with a valve seat body, and it may be a member in an optional mode in which one or more fine openings or nozzle-like openings are formed as orifices.

The fluid-operated valve 15 is typically an AOV which performs valve opening/closing operations using compressed air. Various known AOVs can be used. However, in another embodiment, the fluid-operated valve 15 may be an on/off valve that operates using a fluid other than air, and an on/off valve such as an electromagnetic valve may also be used instead of the fluid-operated valve 15.

The orifice-built-in valve 16 is further provided with a limit switch 20 as a valve opening/closing-detection mechanism. The limit switch 20 is a switch for generating an on/off signal in conjunction with the movement of a valve element 16a (see FIG. 2) of the fluid-operated valve 15, and is configured to allow detection of the actual opening/closing operation of the fluid-operated valve 15. A limit switch as described in, for example, Japanese Unexamined Patent Publication No. 2011-154433 can be used as the limit switch 20.

Furthermore, the pressure-type flow rate control device 100 is provided with a control unit 5, which is connected to, for example, the first pressure sensor P1, the temperature sensor T, the limit switch 20 of the orifice-built-in valve 16, the second pressure sensor P2, and the third pressure sensor P3. In the present embodiment, the control unit 5 is configured to control the control valve 12 in accordance with the output of the first pressure sensor P1, the output of the temperature sensor T, and the output of the second pressure sensor P2 (optional), and when the flow rate obtained by calculation from the output of each of the above sensors is different from the set flow rate inputted from an external device, the degree of opening/closing of the control valve 12 is regulated so as to reduce the difference. In addition, the control unit 5 is configured to receive a detection signal from the opening/closing-detection mechanism (limit switch 20), and is capable of detecting the actual opening/closing of the orifice-built-in valve 16 in real time. The control unit 5 may also be configured to send an opening/closing signal to the drive mechanism (electromagnetic valve 18) of the orifice-built-in valve 16. However, the present invention is not limited to this, and an opening/closing signal may be input to the electromagnetic valve 18 by the external device.

Figure 2:
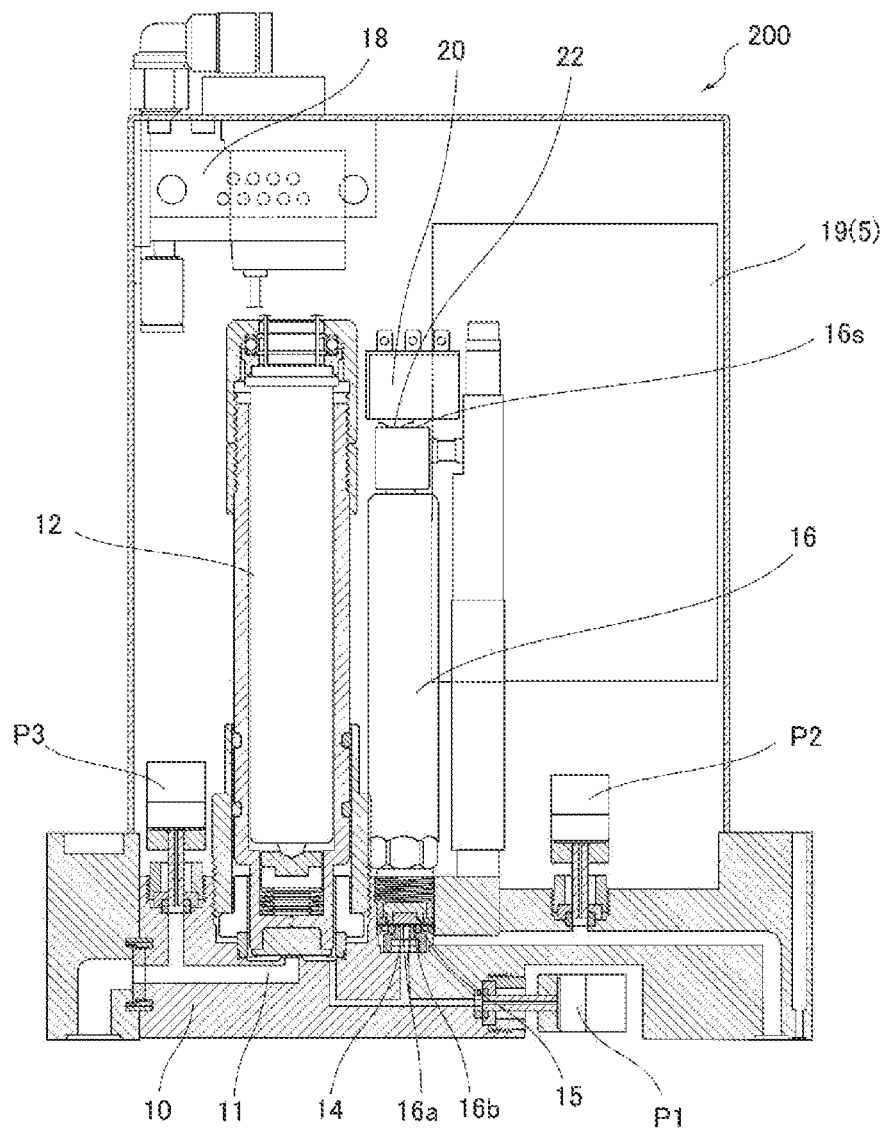
FIG. 2 is a side view showing a more specific constitution of a pressure-type flow rate control device according to one embodiment of the present invention.

FIG. 2 shows a pressure-type flow rate control device 200 having a configuration corresponding to the pressure-type flow rate control device 100 shown in FIG. 1. In the pressure-type flow rate control device 200 shown in FIG. 2, with respect to the block member 10 on which the flow path 11 is formed, the control valve 12, the orifice-built-in valve 16, the first to third pressure sensors P1 to P3 are connected to the flow path 11, and are fixed so as to communicate with each other.

In the pressure-type flow rate control device 200, gas flows from the flow path on the bottom surface side of the pressure-type flow rate control device 200 via the orifice member 14 of the orifice-built-in valve 16, and flows out from the exterior lateral side of the orifice member 14 through the fluid-operated valve 15 provided above the orifice member 14. The fluid-operated valve 15 includes a valve element 16a (for example, a metal diaphragm) and a valve seat body 16b; the valve seat body 16b may be held by an inner disk provided with peripheral gas communication holes. When the valve element 16a is separated from the valve seat body 16b, the gas flowing into the fluid-operated valve 15 can flow out through gas communication holes provided in the inner disk. In this configuration, unlike the pressure-type flow rate control device 100 shown in FIG. 1, the fluid-operated valve 15 is disposed downstream of the orifice member 14. In addition, compressed air is supplied to the fluid-operated valve 15 via the electromagnetic valve 18, but in FIG. 2, the fluid supply member (air tube or the like) between the fluid-operated valve 15 and the electromagnetic valve 18 is not shown and omitted.

The pressure-type flow rate control device 200 has a circuit board 19, and the control unit 5 shown in FIG. 1 is provided thereon. The control unit 5 comprises, for example, a processor (not shown) and a memory unit (not shown) provided on the circuit board 19, may include a computer program for executing predetermined operations, and can be realized by a combination of hardware and software.

In addition, as shown in FIG. 2, in the pressure-type flow rate control device 200, the limit switch 20 is provided directly above the orifice-built-in valve 16. The limit switch 20 has an electrical contact 22 through which electricity flows when it comes into contact with the upper end of a valve rod element (stem or piston) 16s that moves in conjunction with the valve element 16a. By using such an electrical contact 22, opening/closing of the valve can be detected in real time. As described in Japanese Unexamined Patent Application Publication No. 2011-154433 (patent document 3), the positioning of the limit switch 20 may be performed, for example, by adjusting the rotation of a screw member for fixing the limit switch 20. For the sake of reference, the entire disclosures of Japanese Unexamined Patent Application Publication No. 2011-154433 are hereby incorporated by reference.

However, the opening/closing-detection mechanism is not limited to the limit switch 20 of the above-described embodiment, and various known detection mechanisms can be used. For example, a pressure sensor capable of monitoring the operation pressure of the AOV may be provided as the opening/closing-detection mechanism, and opening/closing of the AOV may be determined based on the monitored value of the operation pressure. Furthermore, in the present embodiment, the limit switch 20 is provided directly above the orifice-built-in valve 16, but it may be located at a position other than directly above. As long as the opening/closing-detection mechanism can detect the movement of the valve element 16a, its structure (type), position, etc. are not limited.

In the pressure-type flow rate control device 100, 200 described above, the control unit 5 controls the flow rate to be a given value by controlling the control valve 12 utilizing a predetermined relationship which holds between the upstream pressure ($P_1$) detected by the upstream pressure sensor P1, the downstream pressure ($P_2$) detected by the downstream pressure sensor P2, and the flow rate of the gas flowing through the restriction part (orifice) in accordance with the detected upstream pressure ($P_1$) and downstream pressure ($P_2$). For example, under critical expansion conditions, that is, under a condition satisfying $P_1 \geq$ about $2 \times P_2$, the relationship of the flow rate $Qc=K_1P_1$ (where $K_1$ is constant) holds. Under non-critical expansion conditions, the relationship between the flow rate $Qc=KP_2^m (P_1-P_2)^n$) holds (where K is a proportional coefficient depending on fluid type and fluid temperature, and indices m and n are values derived from the actual flow rate. Therefore, the flow rate Qc can be obtained by calculation using these flow rate equations. The flow rate Qc may be corrected in accordance with the gas temperature detected by the temperature sensor.

When the set flow rate Qs input from an external device is different from the flow rate Qc obtained by the above calculation, the control unit 5 controls the degree of opening/closing of the control valve 12 so that the difference approaches zero. As a result, the flow rate of the gas flowing through the orifice-built-in valve 16 can be adapted to the set flow rate Qs. It should be noted that the set flow rate signal input from the external device may be, for example, a signal generated according to a known ramp function control (that is, a setting signal whose target value changes with time), and the control unit 5 may be configured to receive the ramp rate along with the set flow rate from the external device.

As described above, while the gas flow rate is controlled by regulating the control valve 12, the gas supply/stop is switched by opening/closing the fluid-operated valve 15. In the pressure-type flow rate control devices 100, 200, supply of compressed air to the fluid-operated valve 15 is controlled by opening and closing the electromagnetic valve 18. The electromagnetic valve 18 is, for example, a normal open type on/off valve that is capable of supplying air to the fluid-operated valve 15 during a period when no close signal is given. When a close signal is given to the electromagnetic valve 18, the supply of the compressed air to the fluid-operated valve 15 is stopped, and the fluid-operated valve 15 is operated to close.

However, the fluid-operated valve 15 is connected to the air source via the electromagnetic valve 18 or a regulator (not shown), and cannot be instantaneously closed due to low responsiveness of the compressed air system. That is, since the opening/closing signal to the electromagnetic valve 18 is often not synchronized with the actual opening/closing operation of the fluid-operated valve 15, if the flow rate of the gas is judged based on the opening/closing signal to the electromagnetic valve 18, there is a possibility that the flow rate is determined to be 0 even though the gas is actually flowing.

In contrast, in the pressure-type flow rate control devices 100, 200, since the control unit 5 receives the valve opening/closing detection signal by the limit switch 20, the valve's actual opening/closing state can be detected. Accordingly, the gas flow rate can be determined even if the opening/closing signal sent to the electromagnetic valve 18 is different from the actual valve opening/closing operation, or even when the timing of the valve opening/closing operation is shifted, which allows accurate determination of the actual gas flow rate including any cutoff period (during which the gas flow rate is 0).

Figure 3:
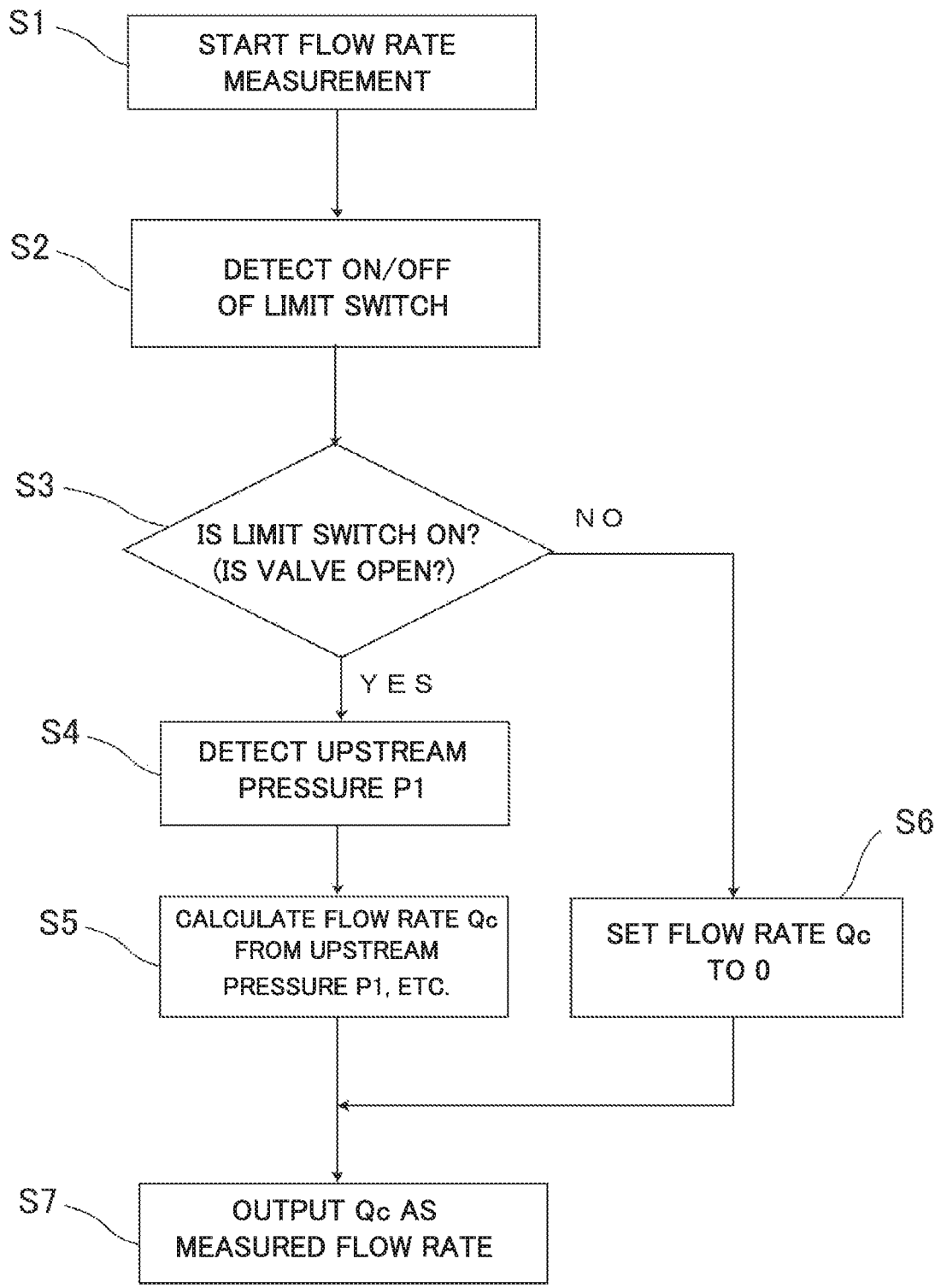
FIG. 3 is a flowchart illustrating an example of a process of detecting the flow rate of a gas by a control unit in a pressure-type flow rate control device according to one embodiment of the present invention.

Below, with reference to FIG. 3, an example of the flow rate measuring step by the control unit 5 of the pressure-type flow rate control devices 100 and 200 will be described.

First, a flow rate measurement is started in step S1, and the ON/OFF state of the limit switch 20 is detected in step S2.

When it is ascertained in step S3 that the limit switch 20 is ON and the orifice-built-in valve 16 is in the open state, in steps S4 and S5, in accordance with the output of the upstream pressure sensor P1, etc. (including output of the temperature sensor T and the downstream pressure sensor P2, etc., in some cases), the flow rate Qc is calculated by using a predetermined equation (for example, $Qc = K_1 P_1$ described above).

Conversely, when it is ascertained in step S3 that the limit switch 20 is OFF and the orifice-built-in valve 16 is in the closed state, it is determined that the flow rate is 0, regardless of the output value of the pressure sensor, and the flow rate Qc is set to 0 in step S6.

In step S7, for the measured flow rate, the flow rate Qc set in step S5 or step S6 is output as the current flow rate. In this manner, it is possible to correctly output the actual flow rate even when a malfunction occurs in the compressed air supply system for the fluid-operated valve. In addition, since the flow rate is set to 0 after confirming the actual closed state of the valve, it is possible to output an accurate flow rate in real time.

INDUSTRIAL APPLICABILITY

Pressure-type flow rate control devices according to embodiments of the present invention are suitably used to control and measure flow rates by being connected to, for example, gas supply lines for manufacturing semiconductors.

DESCRIPTION OF REFERENCE NUMERALS

2 Air source
5 Control unit
10 Block member
11 Flow path
12 Control valve
14 Orifice member
15 Fluid-operated valve
16 Orifice-built-in valve
16a Valve element
16b Valve seat body
18 Electromagnetic valve
20 Limit switch
100, 200 Pressure-type flow rate control device
P1 First (upstream) pressure sensor
P2 Second (downstream) pressure sensor
P3 Third pressure sensor
T temperature sensor

The invention claimed is:

1. A pressure-type flow rate control device comprising: a control valve; a pressure sensor provided downstream of the control valve; an orifice-built-in valve provided downstream of the pressure sensor; and a control unit connected to the control valve and the pressure sensor, the pressure-type flow rate control device being configured to control the control valve in accordance with an output from the pressure sensor;

wherein, the orifice-built-in valve has a valve mechanism comprising a valve seat body and a valve element for opening/closing a flow path; a drive mechanism for driving the valve mechanism; and an orifice member provided in a vicinity of the valve mechanism;

wherein the pressure-type flow rate control device comprises an opening/closing-detection mechanism for detecting an open/closed state of the valve mechanism, the control unit being configured to receive a detection signal from the opening/closing-detection mechanism; and wherein the control unit outputs a flow rate of zero, regardless of an output value of the pressure sensor, when the detection signal from the opening/closing-detection mechanism indicates the orifice-built-in valve is in a closed state.

2. The pressure-type flow rate control device according to claim 1, wherein the valve mechanism comprises a fluid-operated valve; and the drive mechanism comprises an electromagnetic valve for controlling a supply of a fluid to the fluid-operated valve.

3. The pressure-type flow rate control device according to claim 1, wherein the opening/closing-detection mechanism comprises a limit switch, and the limit switch can generate an on/off signal in response to a movement of the valve element.

4. The pressure-type flow rate control device according to claim 1, wherein the control unit detects a gas flow rate passing through the orifice-built-in valve, in accordance with the detection signal from the opening/closing-detection mechanism and an output signal from the pressure sensor.

* * * * *